United States Patent
Liu et al.

(10) Patent No.: US 11,361,186 B2
(45) Date of Patent: Jun. 14, 2022

(54) VISUAL RELATIONSHIP DETECTION METHOD AND SYSTEM BASED ON ADAPTIVE CLUSTERING LEARNING

(71) Applicant: TIANJIN UNIVERSITY, Tianjin (CN)

(72) Inventors: Anan Liu, Tianjin (CN); Yanhui Wang, Tianjin (CN); Ning Xu, Tianjin (CN); Weizhi Nie, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 183 days.

(21) Appl. No.: 17/007,213

(22) Filed: Aug. 31, 2020

(65) Prior Publication Data
US 2021/0192274 A1 Jun. 24, 2021

(30) Foreign Application Priority Data
Dec. 23, 2019 (CN) .......................... 201911341230.3

(51) Int. Cl.
*G06K 9/62* (2022.01)

(52) U.S. Cl.
CPC ......... *G06K 9/6222* (2013.01); *G06K 9/6223* (2013.01); *G06K 9/6232* (2013.01); *G06K 9/6256* (2013.01); *G06K 9/6289* (2013.01)

(58) Field of Classification Search
CPC .. G06K 9/6222; G06K 9/6223; G06K 9/6232; G06K 9/6256; G06K 9/6289
See application file for complete search history.

(56) References Cited

PUBLICATIONS

Jung et al, "Visual Relationship Detection with Language prior and Softmax" (published in 2018 IEEE International Conference on Image Processing, Applications and Systems (IPAS), pp. 143-148, Dec. 2018) (Year: 2018).*

Han et al, "Visual Relationship Detection Based on Local Feature and Context Feature" (published in 2018 International Conference on Network Infrastructure and Digital Content (IC-NIDC), pp. 420-424, Aug. 2018) (Year: 2018).*

(Continued)

*Primary Examiner* — Casey L Kretzer
(74) *Attorney, Agent, or Firm* — Dragon Sun Law Firm, PC; Jinggao Li, Esq.; Nathaniel Perkins

(57) ABSTRACT

The present disclosure discloses a visual relationship detection method based on adaptive clustering learning, including: detecting visual objects from an input image and recognizing the visual objects to obtain context representation; embedding the context representation of pair-wise visual objects into a low-dimensional joint subspace to obtain a visual relationship sharing representation; embedding the context representation into a plurality of low-dimensional clustering subspaces, respectively, to obtain a plurality of preliminary visual relationship enhancing representation; and then performing regularization by clustering-driven attention mechanism; fusing the visual relationship sharing representations and regularized visual relationship enhancing representations with a prior distribution over the category label of visual relationship predicate, to predict visual relationship predicates by synthetic relational reasoning. The method is capable of fine-grained recognizing visual relationships of different subclasses by mining latent relationships in-between, which improves the accuracy of visual relationship detection.

16 Claims, 3 Drawing Sheets

(56) References Cited

PUBLICATIONS

Cewu Lu(B), Ranjay Krishna(B), Michael Bernstein, and Li Fei-Fei, Visual Relationship Detection with Language Priors, Springer International Publishing AG 2016 B. Leibe et al. (Eds.): ECCV 2016, Part I, LNCS 9905, pp. 852-869, 2016.

Justin Johnson1, Ranjay Krishna1, Michael Stark2, Li-Jia Li3,4, David A. Shamma3, Michael S. Bernstein1, Li Fei-Fei1, Image Retrieval using Scene Graphs, 1Stanford University, 2Max Planck Institute for Informatics, 3Yahoo Labs, 4Snapchat.

Ting Yao, Yingwei Pan, Yehao Li, and Tao Mei, Exploring Visual Relationship for Image Captioning,The content of this paper is identical to the content of the officially published ECCV 2018, LNCS version of the paper as available on SpringerLink: https://link.springer.com/conference/eccv.

Jiaxin Shi1, Hanwang Zhang2 Juanzi Li1, Explainable and Explicit Visual Reasoning over Scene Graphs, the final published version of the proceedings is available on IEEE Xplore.

Mark Yatskar1, Luke Zettlemoyer1, Ali Farhadi1,2, Situation Recognition: Visual Semantic Role Labeling for Image Understanding.

Justin Johnson1,2* Agrim Gupta1 Li Fei-Fei1,2, Image Generation from Scene Graphs.

Will Norcliffe-Brown, Efstathios Vafeias, Sarah Parisot, Learning Conditioned Graph Structures for Interpretable Visual Question Answering, 32nd Conference on Neural Information Processing Systems (NeurIPS 2018), Montréal, Canada.

Damien Teney, Lingqiao Liu, Anton Van Den Hengel, Graph-Structured Representations for Visual Question Answering.

Mohammad Amin Sadeghi1;2, Ali Farhadi1, Recognition Using Visual Phrases.

Ruichi Yu, Ang Li, Vlad I. Morariu, Larry S. Davis, Visual Relationship Detection with Internal and External Linguistic Knowledge Distillation.

Bo Dai, Yuqi Zhang, Dahua Lin, Detecting Visual Relationships with Deep Relational Networks.

Danhei Xu1, Y Zhu1 Christopher B. Choy2 Li Fei-Fei1, Scene Graph Generation by Iterative Message Passing.

Rowan Zellers1, Mark Yatskar1,2, Sam Thomson3, Yejin Choi1,2, Neural Motifs: Scene Graph Parsing with Global Context.

An-An Liu, Member, IEEE, Yu-Ting Su, Wei-Zhi Nie, and Mohan Kankanhalli, Fellow, IEEE,Hierarchical Clustering Multi-Task Learning for Joint Human Action Grouping and Recognition, IEEE Transactions on Pattern Analysis and Machine Intelligence, vol. 39, No. 1, Jan. 2017.

* cited by examiner

A man and a woman sit on a park bench along a river.

VISUAL RELATIONSHIP DETECTION METHOD AND SYSTEM BASED ON ADAPTIVE CLUSTERING LEARNING

CROSS-REFERENCE TO RELATED PATENT APPLICATION

This application claims priority to and the benefit of CN 2019113412303, filed Dec. 23, 2019, entitled "VISUAL RELATIONSHIP DETECTION METHOD BASED ON ADAPTIVE CLUSTERING LEARNING," by Anan LIU et al. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present disclosure relates to the technical field of visual relationship detection, and in particular to a method and a system for visual relationship detection based on adaptive clustering learning.

BACKGROUND OF THE PRESENT DISCLOSURE

The goal of visual relationship detection is to detect and localize pair-wise related objects appearing in the image and to infer the visual relationship predicates or interaction modes in-between [1]. As shown in FIG. 1, visual relationships not only capture the spatial and semantic information of "people" and "laptops", but also need to predict the "look" action in-between. Due to structured description and rich semantic space, visual relationship detection can promote the development of high-level visual tasks, such as image retrieval tasks under complex query conditions [2], image content description tasks [3], vision Inference tasks [4] [5], image generation tasks [6], and visual question answering tasks [7] [8].

The rapid development of deep learning in recent years improves a very promising progress of visual relationship detection. Early visual relationship detection method adopted the definition of visual phrases [9], which regarded the combination of visual object pairs and visual relationship predicates as a predictive category. However, this method lacks robustness and heavily depends on sufficient training data, so it is not effective when applied to large-scale visual relationship detection. In recent years, researchers proposed to separate visual objects detection and visual relationship predicate detection to branches, starting from latent semantic prior knowledge and rich contextual visual information.

A method for using latent semantic prior knowledge includes: using language knowledge obtained from large-scale visual relationship training annotations and a public text corpora for visual relationship predication [10].

A method for utilizing rich contextual visual information includes: establishing visual representation between visual objects and visual relationship predicates, context modeling based on spatial location and statistical dependencies [11], and proposing contextual message passing mechanisms based on recurrent neural networks to apply to contextual visual features [12], using long and short-term memory networks to encode global contextual information for visual relational predication [13].

The existing visual relationship detection has following deficiencies:

1. Most of the existing visual relationship detection methods ignore the latent information between different visual relationships: the existing methods do not fully use the latent related visual patterns among different visual relationships, but identify all visual relationships in a unified joint subspace;

2. There are difficulties in mining relationship information between visual relationships: since visual relationship detection included a pair of related visual objects detection and visual relationship predicate detection, the visual relationship modeling is more complex than common visual action modeling and visual targets modeling.

Therefore, a heretofore unaddressed need exists in the art to address the aforementioned deficiencies and inadequacies.

SUMMARY OF THE PRESENT DISCLOSURE

The present disclosure provides a visual relationship detection method based on adaptive clustering learning, which avoids ignoring latent relatedness information between visual relationships when modeling visual relationships in a unified visual relationship space. The present disclosure is capable of fine-grained recognizing visual relationships of different subclasses by mining latent relatedness in-between, which improves the accuracy of visual relationship detection and can be applied to any visual relationship dataset, as described below.

A visual relationship detection method based on adaptive clustering learning, including:
  detecting visual objects from an input image and recognizing the visual objects by contextual message passing mechanisms to obtain context representation of the visual objects;
  embedding the context representations of pair-wise visual objects into a low-dimensional joint subspace to obtain visual relationship sharing representations;
  embedding the context representations of pair-wise visual objects into a plurality of low-dimensional clustering subspaces, respectively, to obtain a plurality of preliminary visual relationship enhancing representation; and then performing regularization to the preliminary visual relationship enhancing representations of different subspaces by clustering-driven attention mechanisms;
  fusing the visual relationship sharing representation and the regularized visual relationship enhancing representation with a prior distribution over the category labels of visual relationship predicate, to predict visual relationship predicates by synthetic relational reasoning.

The method of the present disclosure further includes:
  calculating empirical distribution of the visual relationships from training set samples of the visual relationship data set to obtain a visual relationship prior function.

The method of the present disclosure further includes:
  constructing an initialized visual relationship detection model, and training the model by the training data of the visual relationship data set.

Wherein, the step of obtaining the visual relationship sharing representation is specifically:

obtaining a first product of a joint subject mapping matrix and the context representation of the visual object of the subject, obtaining a second product of a joint object mapping matrix and the context representation of the visual object of the object; subtracting the second product from the first product, and dot-multiplying the difference value and convolutional features of a visual relationship candidate region.

Wherein, the joint subject mapping matrix and the joint object mapping matrix are mapping matrices that map the visual objects context representation to the joint subspace.

The visual relationship candidate region is the minimum rectangle box that can fully cover the corresponding visual object candidate regions of the subject and object; the convolutional features are extracted from the visual relationship candidate region by any convolutional neural network.

Wherein, the step of obtaining a plurality of preliminary visual relationship enhancing representation is specifically:

obtaining a third product of a $k^{th}$ clustering subject mapping matrix and the context representation of the visual object of the subject, obtaining a fourth product of a $k^{th}$ clustering object mapping matrix and the context representation of the visual object of the object; subtracting the fourth product from the third product, and dot-multiplying the difference value and convolutional features of a visual relationship candidate region to obtain a $k^{th}$ preliminary visual relationship enhancing representation.

Wherein, the $k^{th}$ clustering subject mapping matrix and the $k^{th}$ clustering object mapping matrix are mapping matrices that map the visual objects context representation to the $k^{th}$ clustering subspace.

Further, the step of "performing regularization to the preliminary visual relationship enhancing representations of different subspaces by clustering-driven attention mechanisms" is specifically:

obtaining attentive scores of the clustering subspaces;

obtaining a sixth product of the $k^{th}$ preliminary visual relationship enhancing representation and the $k^{th}$ regularized mapping matrix, and performing weighted sum operation to the sixth products of different clustering subspaces by using the attentive scores of the clustering subspace as the clustering weight.

Wherein, the $k^{th}$ regularized mapping matrix is the $k^{th}$ mapping matrix that transforms the preliminary visual relationship enhancing representation.

Wherein, the step of "obtaining attentive scores of the clustering subspace" is specifically:

inputting a predicted category label of visual object of subject and a predicted category label of visual object of object into the visual relationship prior function to obtain a prior distribution over the category label of visual relationship predicate; obtaining a fifth product of the prior distribution over the category label of visual relationship predicate and a $k^{th}$ attention mapping matrix, and substituting the fifth product into the soft max function for normalization.

Wherein, the $k^{th}$ attention mapping matrix is the mapping matrix that transforms the prior distribution over the category label of visual relationship predicate.

The step of "fusing the visual relationship sharing representation and the regularized visual relationship enhancing representation with a prior distribution over the category labels of visual relationship predicate, to predict visual relationship predicates by synthetic relational reasoning" is specifically:

inputting a predicted category label of visual object of subject and a predicted category label of visual object of object into the visual relationship prior function to obtain a prior distribution over the category label of visual relationship predicate;

obtaining a seventh product of the visual relationship sharing mapping matrix and the visual relationship sharing representation, obtaining an eighth product of the visual relationship enhancing mapping matrix and the regularized visual relationship enhancing representation; summing the seventh product and the eighth product and the prior distribution over the category label of visual relationship predicate, and then substituting the result into the soft max function.

The beneficial effects of the technical solution provided by the present disclosure are:

1. the present disclosure avoids ignoring the latent relatedness information between different visual relationships when modeling visual relationships in a unified visual relationship space, and can perform fine-grained recognition to visual relationships of different subclasses through latent relatedness mining;

2. the present disclosure improves the accuracy of visual relationship detection and can be applied to any visual relationship dataset.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

DETAILED DESCRIPTION OF THE PRESENT DISCLOSURE

Figure 1:
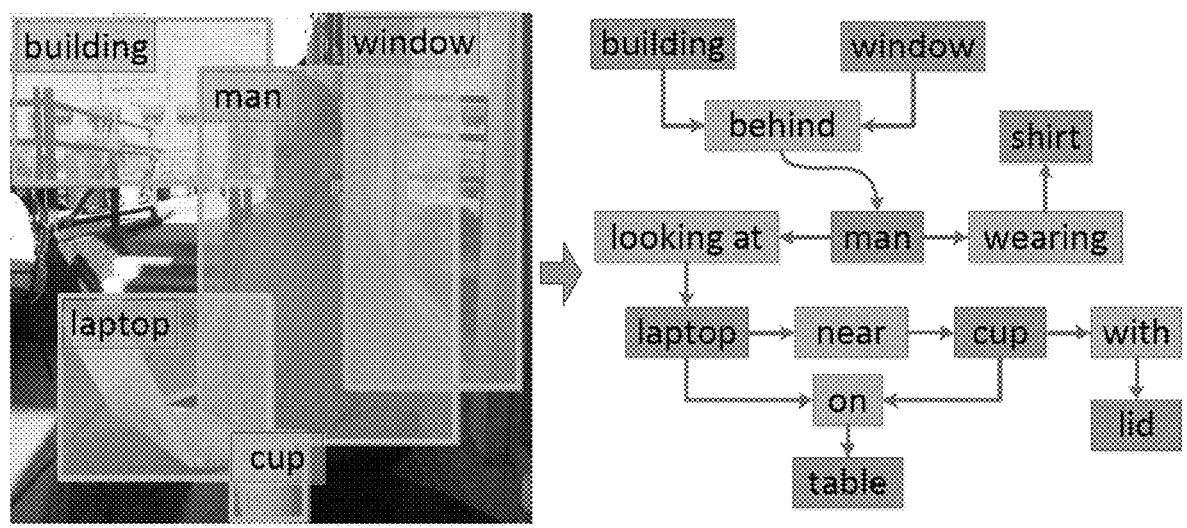
FIG. 1 is a schematic structure diagram of the definition of visual objects and visual relationships in an image.

The method provided by the present disclosure will be described below in detail by embodiments with reference to the accompanying drawings. The present disclosure may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Figure 2:
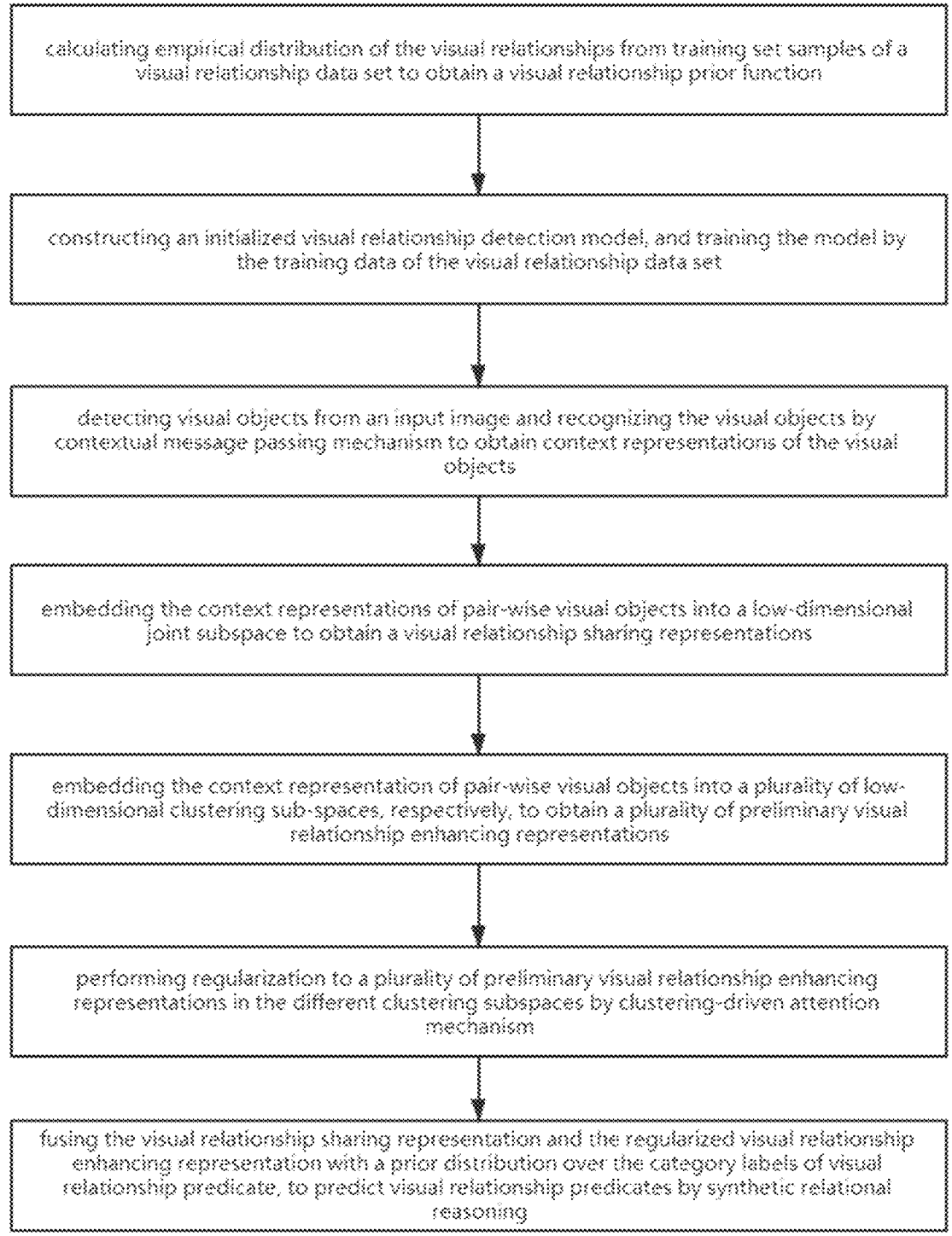
FIG. 2 is a flowchart of a visual relationship detection method based on adaptive clustering learning.
Figure 3:
FIG. 3 is an example diagram showing the visual relationship data of a common visual relationship dataset.
Figure 3:
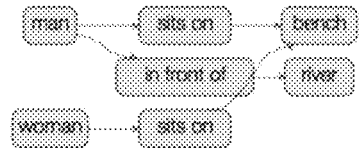

In order to solve the above problems, a visual relationship detection method capable of fully, automatically, and accurately mining latent relatedness information between visual relationships is needed. Studies have shown that there exist highly relevant visual relationships in reality. The existing visual relationships share a specific visual mode and characteristics, thus we can further complete fine-grained detection of multiple visual relationships based on the recognition of highly relevant visual relationships, and can improve the recall rate of visual relationship detection (hereinafter referred to as VRD). The present disclosure proposes a VRD method based on adaptive clustering learning. Referring to FIG. 2, the method of the present disclosure includes the following steps:

101: calculating empirical distribution of the visual relationships from training set samples of the visual relationship data set to obtain a visual relationship prior function.

Wherein, the visual relationship data set may be any data set containing images and corresponding visual relationship annotations, including but not limited to a VisualGenome data set. The training set samples of the visual relationship data set include training images and corresponding visual relationship true label data. The visual relationship true label data of each training image includes: a visual object true category label $ô_i$ of the subject, a visual object true category label $ô_j$ of the object and a corresponding visual relationship predicate true category label $r_{i \to j}$. Given the visual object true category label $ô_i$ of the subject and the visual object true category label $ô_j$ of the object, calculating the corresponding conditional empirical distribution of the visual relationship predicate true category label $P(r_{i \to j}|ô_i,ô_j)$ in all visual relationship true label date, which is then stored as the visual relationship prior function $w(ô_i,ô_j)$.

102: Constructing an initialized visual relationship detection model, and training the model by the training data of the visual relationship data set.

Wherein, the visual relationship data set may be any data set containing images and corresponding visual relationship annotations, including but not limited to a VisualGenome data set. The training data of the visual relationship data set includes: training images, and corresponding visual relationship true region data and true label data. And the true region data of each training image include: a visual object true region of the subject, a visual object true region of the object, and a corresponding visual relationship predicate true region. The true label data of each training image include: a visual object true category label of the subject, a visual object true category label of the object, and a corresponding visual relationship predicate true category label.

During the process of training an initialized VRD model, the embodiment uses the initialized VRD model to predict a subject visual object prediction category label, an object visual object prediction category label and a corresponding visual relationship predicate prediction category label of each training image, and obtain category training errors between the subject visual object prediction category label and the subject visual object true category label, between the object visual object prediction category label and the object visual object true category label, and between visual relationship predicate prediction category label and the visual relationship predicate true category label; and further obtain region training errors between the subject visual object prediction region and the subject visual object true region, between the object visual object prediction region and the object visual object true region, and between visual relationship predicate prediction region and the visual relationship predicate true region.

In the embodiment, the gradient back-propagation operation is performed iteratively to the model according to the category training errors and the region training errors of each training image until the model converges, and the parameters in the trained VRD model are applied to the subsequent steps.

103: Detecting visual objects from an input image and recognizing the visual objects by contextual message passing mechanism to obtain context representations of the visual objects.

Firstly, a candidate region set and a corresponding candidate region feature set are extracted from the input image.

Wherein, any object t detector can be used for the extraction operation, including but not limited to the Faster-CNN object detector used in this embodiment; candidate regions include visual object candidate regions and visual relationship candidate regions. The visual relationship candidate region is represented by the minimum rectangle box that can fully cover the corresponding visual object candidate regions of the subject and object, and the visual object candidate regions of the subject and object comprise any one of a plurality of the visual object candidate regions. The candidate region feature includes: a visual object candidate region convolutional feature $f_i$, a visual object category label probability $l_i$, and a visual object candidate region bounding box coordinate $b_i$; the visual relationship candidate region feature includes a visual relationship candidate region convolutional feature $f_{i,j}$.

Secondly, contextual encoding is performed on the visual object candidate region features to obtain the visual object representations.

Wherein, the embodiment adopts a bi-directional long-short-term memory network (biLSTM) to sequentially encode all the visual object candidate region features to obtain the object context representations C:

$$C = \mathrm{biLSTM}_1([f_i; W_1 l_i]_{i=1,\ldots,N}) \quad (1)$$

where the parameters of the bi-directional long-short-term memory network (biLSTM) are obtained in the step 102, $C=\{c_i\}_{i=1}^N$ is the set of hidden state of long-short-term memory network (LSTM) and $c_i$ corresponds to the $i^{th}$ input visual object candidate region feature; $W_1$ is the learned parameters obtained in the step 102; [;] denotes the concatenation operation, and N is the number of the input visual object candidate region features.

Thirdly, visual objects is recognized by using the visual object representations.

Wherein, the embodiment adopt a LSTM to predict the $i^{th}$ visual object category label $ô_i$ depending on visual object representation $c_i$ and the previously detected i-1$^{th}$ label $ô_{i-1}$:

$$h_i = \mathrm{LSTM}_1([c_i; ô_{i-1}]) \quad (2)$$

$$ô_i = \mathrm{argmax}(W_2 h_i) \quad (3)$$

where the parameters of the LSTM are obtained in the step 102, $h_i$ is the hidden state of the LSTM, $W_2$ is the learned parameters obtained in the step 102.

Finally, the visual object context representations are obtained by visual object representations and visual object label embeddings.

Wherein, due to visual object label embeddings are beneficial to visual relationships inference, this embodiment adopts another biLSTM to predict the visual object context representations depending on the previously predicted visual object category label $ô_i$ and the visual object representation $c_i$:

$$D = \mathrm{biLSTM}_2([c_i; W_3 ô_i]_{i=1,\ldots,N}) \quad (4)$$

where the parameters of the biLSTM are obtained in the step 102, $D=\{d_i\}_{i=1}^N$ is the set of hidden state of the LSTM and $d_i$ corresponds to the $i^{th}$ input visual object representation; $W_3$ is the learned parameters in the step 102.

104: embedding the context representations of pair-wise visual objects into a low-dimensional joint subspace to obtain a visual relationship sharing representations.

Where the detected subject visual object context representation is denoted as $d_i$, the object visual object context representation is denoted as $d_j$, the subject and object visual object context representations include any two of a plurality of the visual object context representations, and $f_{i,j}$ is the convolutional features of the visual relationship candidate region corresponding to the subject visual object and the object visual object, and the visual relationship sharing representation can be obtained as follows:

$$E_{i,j}^s = (W_{es}d_i - W_{eo}d_j) \circ f_{i,j} \quad (5)$$

where $W_{es}$ and $W_{eo}$ are the joint subject mapping matrix and the joint object mapping matrix that map the visual object context representations to the joint subspace, which are obtained by the step 102; "∘" represents element-wise multiplication operation, and $E_{i,j}^s$ is a visual relationship sharing representation obtained by calculation.

105: embedding the context representation of pair-wise visual objects into a plurality of low-dimensional clustering subspaces, respectively, to obtain a plurality of preliminary visual relationship enhancing representations.

Where the detected subject visual object context representation is denoted as $d_i$, the object visual object context representation is denoted as $d_j$, the subject and object visual object context representation include any two of a plurality of the visual object context representations, and $f_{i,j}$ is the convolutional features of the visual relationship candidate region corresponding to the subject visual object and the object visual object, and the $k^{th}$ preliminary visual relationship enhancing representation can be obtained as follows:

$$e_{i,j}^k = (W_{es}^k d_i - W_{eo}^k d_j) \circ f_{i,j}, k \in [1,K] \quad (6)$$

where $W_{es}^k$ and $W_{eo}^k$ are a clustering subject mapping matrix and a clustering object mapping matrix that map the visual object context representations to the $k^{th}$ clustering subspace, which are obtained by the step 102; $e_{i,j}^k$ represents the obtained $k^{th}$ preliminary visual relationship enhancing representation, and K is the number of the clustering subspaces.

106: performing regularization to a plurality of preliminary visual relationship enhancing representations in the different clustering subspaces by clustering-driven attention mechanism.

Where the $i^{th}$ and the $j^{th}$ visual object category labels are denoted as $\hat{o}_i$ and $\hat{o}_j$, respectively; attentive scores of the clustering subspaces can be obtained by following:

$$\alpha_{i,j}^k = \text{soft max}(W_\alpha^k w(\hat{o}_i, \hat{o}_j)), j \in [1,n], k \in [1,K] \quad (7)$$

where $W_\alpha^k$ is the $k^{th}$ attention mapping matrix, which is obtained by the step 102; $w(\bullet,\bullet)$ is the visual relationship prior function; $\alpha_{i,j}^k$ is an attentive score of the $k^{th}$ clustering subspace, and soft max(∘) represents the following equation:

$$\text{softmax}(i_j) = \frac{\exp(i_j)}{\sum_{t=1}^{n} \exp(i_t)}, j \in [1, n].$$

Where $i_j$ represents the $j^{th}$ input variable of the soft max function, and n represents the number of input variables of the soft max function;

where $e_{i,j}^k$ is obtained $kt^h$ preliminary visual relationship enhancing representation, and the regularized visual relationship enhancing representation can be calculated as follows:

$$E_{i,j}^p = \sum_k \alpha_{i,j}^k \circ W_b^k e_{i,j}^k, k \in [1, K] \quad (8)$$

where $W_b^k$ is the regularized mapping matrix that transforms the kth preliminary visual relationship enhancing representation, which is obtained by the step 102, and $E_{i,j}^p$ represents the regularized visual relationship enhancing representation.

107: fusing the visual relationship sharing representation and the regularized visual relationship enhancing representation with a prior distribution over the category labels of visual relationship predicate, to predict visual relationship predicates by synthetic relational reasoning.

Where $E_{i,j}^s$ is the visual relationship sharing representation, $E_{i,j}^p$ is the regularized visual relationship enhancing representation, $w(\bullet,\bullet)$ is the visual relationship prior function, and the probability distribution $\Pr(d_{i \to j}|B,O)$ of the $i^{th}$ and $j^{th}$ visual objects corresponding to the visual relationship predicate can be obtained by following:

$$\Pr(d_{i \to j}|B,O) = \text{soft max}(W_r^s E_{i,j}^s + W_r^p E_{i,j}^p + w(\hat{o}_i, \hat{o}_j)) \quad (9)$$

where $W_r^s$ and $W_r^p$ are learned visual relationship sharing mapping matrix and visual relationship enhancing mapping matrix, respectively, which are obtained by the step 102; w $(\hat{o}_i, \hat{o}_j)$ represents the prior distribution over visual relationship predict category labels when the subject visual object category label is $\hat{o}_i$ and the object visual object category label is $\hat{o}_j$.

The methods and systems of the present disclosure can be implemented on one or more computers or processors. The methods and systems disclosed can utilize one or more computers or processors to perform one or more functions in one or more locations. The processing of the disclosed methods and systems can also be performed by software components. The disclosed systems and methods can be described in the general context of computer-executable instructions such as program modules, being executed by one or more computers or devices. For example, each server or computer processor can include the program modules such as mathematical construction module, simplifying module, and maximum delay calculation module, and other related modules described in the above specification. These program modules or module related data can be stored on the mass storage device of the server and one or more client devices. Each of the operating modules can comprise elements of the programming and the data management software.

The components of the server can comprise, but are not limited to, one or more processors or processing units, a system memory, a mass storage device, an operating system, a system memory, an Input/Output Interface, a display device, a display interface, a network adaptor, and a system bus that couples various system components. The server and one or more power systems can be implemented over a wired or wireless network connection at physically separate locations, implementing a fully distributed system. By way of example, a server can be a personal computer, portable computer, smartphone, a network computer, a peer device, or other common network node, and so on. Logical connections between the server and one or more power systems can be made via a network, such as a local area network (LAN) and/or a general wide area network (WAN).

Although the principle and implementations of the present disclosure have been described above by specific examples in the embodiments of the present disclosure, the foregoing description of the embodiments is merely for helping understanding the method of the present disclosure and the core concept thereof.

Meanwhile, various alterations to the specific implementations and application ranges may come to a person of ordinary skill in the art according to the concept of the present disclosure. In conclusion, the contents of this specification shall not be regarded as limitations to the present disclosure.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

[1] Lu C, Krishna R, Bernstein M, et al. Visual relationship detection with language priors[C]//European Conference on Computer Vision. Springer, Cham, 2016: 852-869.
[2] Johnson J, Krishna R, Stark M, et al. Image retrieval using scene graphs[C]//Proceedings of the IEEE conference on computer vision and pattern recognition. 2015: 3668-3678.
[3] Yao T, Pan Y, Li Y, et al. Exploring visual relationship for image captioning[C]//Proceedings of the European Conference on Computer Vision (ECCV). 2018: 684-699.
[4] Shi J, Zhang H, Li J. Explainable and explicit visual reasoning over scene graphs[C]//Proceedings of the IEEE Conference on Computer Vision and Pattern Recognition. 2019: 8376-8384.
[5] Yatskar M, Zettlemoyer L, Farhadi A. Situation recognition: Visual semantic role labeling for image understanding[C]//Proceedings of the IEEE Conference on Computer Vision and Pattern Recognition. 2016: 5534-5542.
[6] Johnson J, Gupta A, Fei-Fei L. Image generation from scene graphs[C]//Proceedings of the IEEE Conference on Computer Vision and Pattern Recognition. 2018: 1219-1228.
[7] Norcliffe-Brown W, Vafeias S, Parisot S. Learning conditioned graph structures for interpretable visual question answering [C]//Advances in Neural Information Processing Systems. 2018: 8334-8343.
[8] Teney D, Liu L, van den Hengel A. Graph-structured representation for visual question answering[C]//Proceedings of the IEEE Conference on Computer Vision and Pattern Recognition. 2017: 1-9.
[9] Sadeghi M A, Farhadi A. Recognition using visual phrases [C]//CVPR 2011. IEEE, 2011: 1745-1752.
[10] Yu R, Li A, Morariu V I, et al. Visual relationship detection with internal and external linguistic knowledge distillation[C]//Proceedings of the IEEE International Conference on Computer Vision. 2017: 1974-1982.
[11] Dai B, Zhang Y, Lin D. Detecting visual relationships with deep relational networks[C]//Proceedings of the IEEE Conference on Computer Vision and Pattern Recognition. 2017: 3076-3086.
[12] Xu D, Zhu Y, Choy C B, et al. Scene graph generation by iterative message passing[C]//Proceedings of the IEEE Conference on Computer Vision and Pattern Recognition. 2017: 5410-5419.
[13] Zellers R, Yatskar M, Thomson S, et al. Neural motifs: Scene graph parsing with global context[C]//Proceedings of the IEEE Conference on Computer Vision and Pattern Recognition. 2018: 5831-5840.
[14] Liu A A, Su Y T, Nie W Z, et al. Hierarchical clustering multi-task learning for joint human action grouping and recognition[1]. IEEE transactions on pattern analysis and machine intelligence, 2016, 39(1): 102-114.

What is claimed is:

1. A visual relationship detection method based on adaptive clustering learning, comprising, executed by a processor, the following steps:
   detecting visual objects from an input image and recognizing the visual objects by a contextual message passing mechanism to obtain context representations of the visual objects;
   embedding the context representations of pair-wise visual objects into a low-dimensional joint subspace to obtain visual relationship sharing representations;
   embedding the context representations of pair-wise visual objects into a plurality of low-dimensional clustering subspaces, respectively, to obtain a plurality of preliminary visual relationship enhancing representations; and then performing regularization to the preliminary visual relationship enhancing representations by clustering-driven attention mechanisms; and
   fusing the visual relationship sharing representations, the regularized visual relationship enhancing representations and a prior distribution over category labels of visual relationship predicates, to predict visual relationship predicates by synthetic relational reasoning.

2. The visual relationship detection method based on adaptive clustering learning according to claim 1, wherein the method further comprises:
   calculating empirical distribution of the visual relationships from training set samples of a visual relationship data set to obtain a visual relationship prior function.

3. The visual relationship detection method based on adaptive clustering learning according to claim 1, wherein the method further comprises:
   constructing an initialized visual relationship detection model, and training the model by the training data of the visual relationship data set.

4. The visual relationship detection method based on adaptive clustering learning according to claim 1, wherein the step of obtaining the visual relationship sharing representations is specifically:
   obtaining a first product of a joint subject mapping matrix and the context representations of the visual object of the subject, obtaining a second product of a joint object mapping matrix and the context representations of the visual object of the object;
   subtracting the second product from the first product, and dot-multiplying the difference value and convolutional features of a visual relationship candidate region;
   wherein, the joint subject mapping matrix and the joint object mapping matrix are mapping matrices that map the visual objects context representations to a joint subspace; and the visual relationship candidate region is the minimum rectangle box that can fully cover the corresponding visual object candidate regions of the subject and object;

the convolutional features are extracted from the visual relationship candidate region by a convolutional neural network.

5. The visual relationship detection method based on adaptive clustering learning according to claim 4, wherein the step of obtaining a plurality of preliminary visual relationship enhancing representation is specifically:

obtaining a third product of a $k^{th}$ clustering subject mapping matrix and the context representation of the visual object of the subject, obtaining a fourth product of a $k^{th}$ clustering object mapping matrix and the context representation of the visual object of the object;

subtracting the fourth product from the third product, and dot-multiplying the difference value and convolutional features of a visual relationship candidate region to obtain a $k^{th}$ preliminary visual relationship enhancing representation;

wherein the $k^{th}$ clustering subject mapping matrix and the $k^{th}$ clustering object mapping matrix are mapping matrices that map the visual objects context representation to the $k^{th}$ clustering subspace.

6. The visual relationship detection method based on adaptive clustering learning according to claim 5, wherein the step of "performing regularization to the preliminary visual relationship enhancing representations of different subspaces by clustering-driven attention mechanisms" is specifically:

obtaining attentive scores of the clustering subspaces;

obtaining a sixth product of the $k^{th}$ preliminary visual relationship enhancing representations and the $k^{th}$ regularized mapping matrix, and performing weighted sum operation to the sixth products of different clustering subspaces by using the attentive scores of the clustering subspace as the clustering weight;

wherein, the $k^{th}$ regularized mapping matrix is the $k^{th}$ mapping matrix that transforms the preliminary visual relationship enhancing representation.

7. The visual relationship detection method based on adaptive clustering learning according to claim 6, wherein the step of "obtaining attentive scores of the clustering subspaces" is specifically:

inputting a predicted category label of visual object of subject and a predicted category label of visual object of object into the visual relationship prior function to obtain a prior distribution over the category label of visual relationship predicate; obtaining a fifth product of the prior distribution over the category label of visual relationship predicate and the $k^{th}$ attention mapping matrix, and substituting the fifth product into the softmax function for normalization;

wherein, the $k^{th}$ attention mapping matrix is the mapping matrix that transforms the prior distribution over the category label of visual relationship predicate.

8. The visual relationship detection method based on adaptive clustering learning according to claim 6, wherein the step of "fusing the visual relationship sharing representations and the regularized visual relationship enhancing representations with a prior distribution over category labels of visual relationship predicates, to predict visual relationship predicates by synthetic relational reasoning" is specifically:

inputting a predicted category label of visual object of subject and a predicted category label of visual object of object into the visual relationship prior function to obtain a prior distribution over the category label of visual relationship predicate; and obtaining a seventh product of the visual relationship sharing mapping matrix and the visual relationship sharing representations, obtaining an eighth product of the visual relationship enhancing mapping matrix and the regularized visual relationship enhancing representations; summing the seventh product, the eighth product and the prior distribution over the category label of visual relationship predicate, and then substituting the result into the softmax function.

9. A system for a visual relationship detection method based on adaptive clustering learning, the system comprising:

a processor configured for:

detecting visual objects from an input image and recognizing the visual objects by a contextual message passing mechanism to obtain context representations of the visual objects;

embedding the context representations of pair-wise visual objects into a low-dimensional joint subspace to obtain visual relationship sharing representations;

embedding the context representations of pair-wise visual objects into a plurality of low-dimensional clustering subspaces, respectively, to obtain a plurality of preliminary visual relationship enhancing representations; and then performing regularization to the preliminary visual relationship enhancing representations by clustering-driven attention mechanisms; and fusing the visual relationship sharing representations, the regularized visual relationship enhancing representations and a prior distribution over category labels of visual relationship predicates, to predict visual relationship predicates by synthetic relational reasoning.

10. The system according to claim 9, wherein the method further comprises:

calculating empirical distribution of the visual relationships from training set samples of a visual relationship data set to obtain a visual relationship prior function.

11. The system according to claim 9, wherein the method further comprises: constructing an initialized visual relationship detection model, and training the model by the training data of the visual relationship data set.

12. The system according to claim 9, wherein the step of obtaining the visual relationship sharing representations is specifically:

obtaining a first product of a joint subject mapping matrix and the context representations of the visual object of the subject, obtaining a second product of a joint object mapping matrix and the context representations of the visual object of the object;

subtracting the second product from the first product, and dot-multiplying the difference value and convolutional features of a visual relationship candidate region;

wherein, the joint subject mapping matrix and the joint object mapping matrix are mapping matrices that map the visual objects context representations to a joint subspace; and the visual relationship candidate region is the minimum rectangle box that can fully cover the corresponding visual object candidate regions of the subject and object;

the convolutional features are extracted from the visual relationship candidate region by a convolutional neural network.

13. The system according to claim 12, wherein the step of obtaining a plurality of preliminary visual relationship enhancing representation is specifically:

obtaining a third product of a $k^{th}$ clustering subject mapping matrix and the context representation of the visual object of the subject, obtaining a fourth product of a $k^{th}$ clustering object mapping matrix and the context representation of the visual object of the object;
subtracting the fourth product from the third product, and dot-multiplying the difference value and convolutional features of a visual relationship candidate region to obtain a $k^{th}$ preliminary visual relationship enhancing representation;

wherein the $k^{th}$ clustering subject mapping matrix and the $k^{th}$ clustering object mapping matrix are mapping matrices that map the visual objects context representation to the $k^{th}$ clustering subspace.

14. The system according to claim 13, wherein the step of "performing regularization to the preliminary visual relationship enhancing representations of different subspaces by clustering-driven attention mechanisms" is specifically:

obtaining attentive scores of the clustering subspaces;
obtaining a sixth product of the $k^{th}$ preliminary visual relationship enhancing representations and the $k^{th}$ regularized mapping matrix, and performing weighted sum operation to the sixth products of different clustering subspaces by using the attentive scores of the clustering subspace as the clustering weight;

wherein, the $k^{th}$ regularized mapping matrix is the $k^{th}$ mapping matrix that transforms the preliminary visual relationship enhancing representation.

15. The system according to claim 14, wherein the step of "obtaining attentive scores of the clustering subspaces" is specifically:

inputting a predicted category label of visual object of subject and a predicted category label of visual object of object into the visual relationship prior function to obtain a prior distribution over the category label of visual relationship predicate; obtaining a fifth product of the prior distribution over the category label of visual relationship predicate and the $k^{th}$ attention mapping matrix, and substituting the fifth product into the softmax function for normalization;

wherein, the $k^{th}$ attention mapping matrix is the mapping matrix that transforms the prior distribution over the category label of visual relationship predicate.

16. The system according to claim 14, wherein the step of "fusing the visual relationship sharing representations and the regularized visual relationship enhancing representations with a prior distribution over the category labels of visual relationship predicates, to predict visual relationship predicates by synthetic relational reasoning" is specifically:

inputting a predicted category label of visual object of subject and a predicted category label of visual object of object into the visual relationship prior function to obtain a prior distribution over the category label of visual relationship predicate; and obtaining a seventh product of the visual relationship sharing mapping matrix and the visual relationship sharing representations, obtaining an eighth product of the visual relationship enhancing mapping matrix and the regularized visual relationship enhancing representations; summing the seventh product, the eighth product and the prior distribution over the category label of visual relationship predicate, and then substituting the result into the softmax function.

* * * * *